Sept. 11, 1956     I. B. LUECK ET AL     2,762,260

TRIFOCAL OPHTHALMIC LENS BLANK SERIES

Filed Aug. 13, 1953

INVENTORS
IRVING B. LUECK
BY GORDON L. TAYLOR

ATTORNEY

United States Patent Office 2,762,260
Patented Sept. 11, 1956

2,762,260
TRIFOCAL OPHTHALMIC LENS BLANK SERIES

Irving B. Lueck, Perinton, and Gordon L. Taylor, Irondequoit, N. Y., assignors to Bausch & Lomb Optical Company, Rochester, N. Y., a corporation of New York Application August 13, 1953, Serial No. 373,964

2 Claims. (Cl. 88—54)

This invention relates to ophthalmic lenses and more particularly it has reference to trifocal ophthalmic lenses and lens blanks which embody separate fields for near, intermediate and distant vision.

As a person grows older, the eyes gradually lose their power of accommodation until at about the ages of 40–50 years it is usually necessary to use lenses to provide clear, distinct vision of near objects such as, for example, reading material. Such types of reading lenses are generally embodied in bifocal lenses having separate fields for near and distant vision. In the early stages of presbyopia, there is usually sufficient accommodation remaining to provide, with the aid of bifocal lenses, clear vision of objects located at various distances from infinity to the near point.

However, when the power of the required reading or near vision portion approaches and exceeds about 1.50 D, a continuous range of clear vision from infinity to the near point cannot be attained with a bifocal lens. As the amplitude of accommodation decreases the need for near vision power increases. It has been found, for example, that a person requiring 2.00 D for near vision has, on the average, an available binocular accommodation of about 1.50 D. Hence, in order to attain a continuous range of clear vision from infinity to the near point, it is necessary to use an intermediate vision field having a dioptric power which is less than that of the near vision field. For comfortable vision, however, only a portion of the available accommodation should be used.

Under the generally prevailing commercial practice, a manufacturer produces a series of semi-finished trifocal lens blanks in which there is a constant ratio between the additive dioptric power of the intermediate field and the additive dioptric power of the near vision field. Thus, one manufacturer may sell trifocal lenses in which the power of the intermediate field is one-half of the power of the near vision field, regardless of the required dioptric power of the near vision field. The use of a fixed ratio of intermediate power to near vision power for the entire range of near or reading powers does not, however, produce an integrated series of trifocal lens blanks from which there can be made finished lenses which will provide a continuous range of comfortable, clear, vision of objects located at distances ranging from infinity to the near point.

It is an object of this invention to overcome the aforementioned difficulties and provide an integrated series of trifocal ophthalmic lens blanks from which may be produced lenses which will afford, throughout an extended range of reading powers, a substantially continuous range of clear, comfortable, vision for objects located at distances varying from infinity to the near point. A further object is to provide a series of semi-finished trifocal lens blanks which will provide lenses having near vision powers ranging from 1.50–4.50 D and with the ratios between the dioptric powers of the intermediate and near vision fields so chosen that each lens produced from the series of lens blanks will provide a substantially continuous range of clear, comfortable, vision for objects located at distances varying from infinity to the near point.

These and other objects and advantages reside in certain novel features of construction, arrangement and combination of parts as will hereinafter be more fully described and pointed out in the appended claims.

The present application is a continuation-in-part of our application Serial No. 207,944, filed January 26, 1951, now abandoned.

Referring to the drawings.

Figure 1:
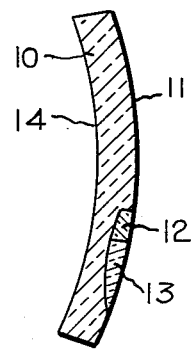
Fig. 1 is a vertical sectional view of one of the trifocal lens blanks in our improved series.
Figure 2:
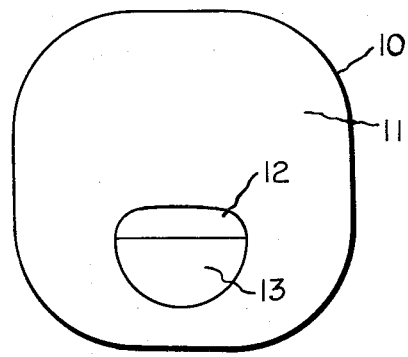
Fig. 2 is a front view thereof.
Figure 3:
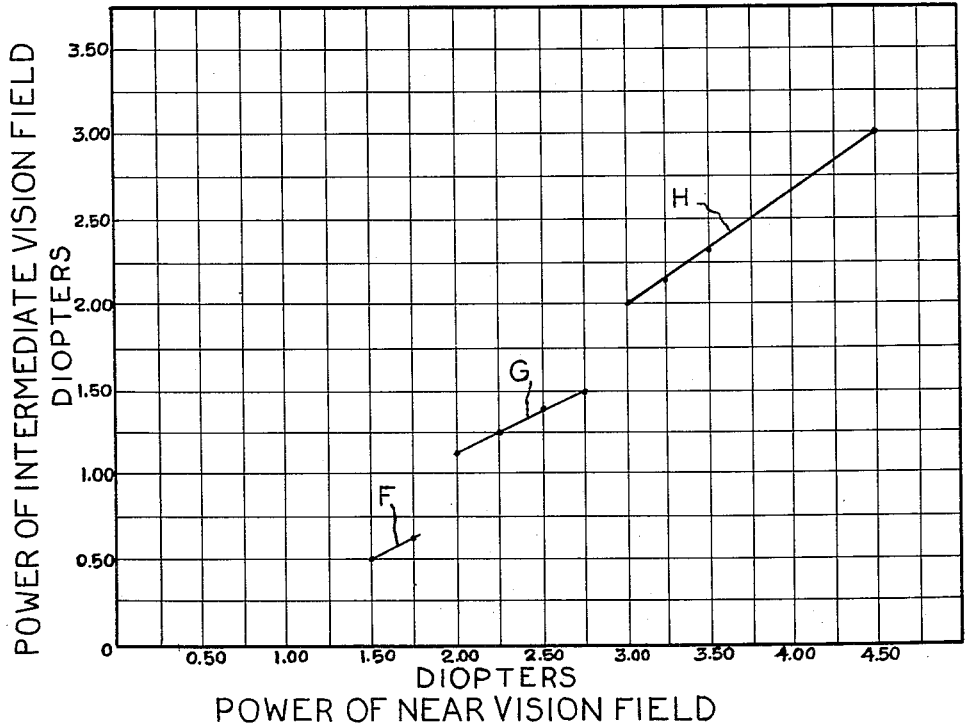
Fig. 3 is a chart showing the relation between the powers of the intermediate and near vision fields for lens blanks in a series embodying one form of our invention.

As previously stated, the amplitude of accommodation decreases as the need for added power for near vision increases. The following statistical table shows the average binocular accommodation, to the nearest ⅛ diopter, which is available when various near vision powers are required.

| Near Vision Power, D | Average Binocular Accommodation, D |
|---|---|
| 1.50 | 2.12 |
| 1.75 | 1.87 |
| 2.00 | 1.50 |
| 2.25 | 1.12 |
| 2.50 | 0.75 |
| 2.75 | 0.50 |
| 3.00 | 0.50 |
| 3.25 | .50 |
| 3.50 | .50 |
| 3.75 | .50 |
| 4.00 | .50 |
| 4.25 | .50 |
| 4.50 | .50 |

In order that a presbyope may experience comfortable vision and not be subject to eyestrain, it is essential that a portion of the available amplitude of accommodation be held in reserve while the other portion is being used for near vision. It is to be noted from the above table that a presbyope who needs less dioptric power for near vision has a greater amount of available accommodation than one who requires a greater dioptric power for near vision. Hence, in the lower ranges of near vision power, a person uses a lower percentage of the total available accommodation and in the higher ranges of near vision power a person uses proportionately more of the total available amplitude of accommodation. In order to provide continuous clear vision without blur regions, it is necessary that the ranges of clear vision through the near and intermediate fields of a trifocal lens be in overlapping relation.

In order to produce an integrated series of trifocal lenses, having an extended range of near vision powers, which can be manufactured on a commercial basis, we have provided a series of lens blanks having near and intermediate powers as indicated at F, G and H on the drawing. The entire series comprises three groups of lens blanks represented, respectively, by the lines F, G and H. Under the prevailing commercial practices, the dioptric powers of the near and intermediate fields are made in graded steps of ¼ diopter.

In the lower range F, including lens blanks having near vision powers of 1.50–1.75 D, both inclusive, the intermediate vision power is substantially 35% of the near vision power. For the lens blanks in group G, including lens blanks having near vision powers of 2.00–2.75 D, both inclusive, the intermediate vision power is substantially 55% of the near vision power and the group H lens blanks, having near vision powers from 3.00–4.50 D, both inclusive, have intermediate powers amounting to substantially 66% of the near vision powers. This provides an integrated series of trifocal lens blanks from which can be produced lenses which will give continuous, comfortable vision of objects located from near to distance for presbyopes needing near vision powers from 1.50 D to 4.50 D, both inclusive. It is to be understood, of course, that changes may be made in the groupings of the lens blanks or in the ratios between near and intermediate powers. Some of these changes may, for example, be dictated by the availability of glasses of certain refractive indices which are used for the manufacture of the lenses. It is essential, however, that the trifocal lens blanks having near vision powers ranging from 1.50–4.50 D be divided into a plurality of groups with each group having a different near to intermediate power ratio and with the smaller ratios used in the lower ranges of the near vision powers.

A semi-finished blank of our series is shown at 10 as having a front or convex surface 11, which is polished and finished, and the embedded fused segments 12 and 13 providing the intermediate and near vision fields, respectively.

The prescription optician then grinds and polishes a surface on the rear or concave side 14 of the blank of such curvature that the finished lens will have the desired dioptric powers through the distant, intermediate and near vision fields. All semi-finished lens blanks in a series of blanks embodying our invention have the same curvature on their convex, finished surfaces. Thus in one series of our blanks, each blank thereof has a front finished surface whose radius of curvature is 93.38 mm. and the series consists of three groups F, G and H having, respectively, near vision power ranges of 1.50–1.75 D, 2.00–2.75 D, and 3.00–4.50 D. The additive powers of the intermediate vision fields of the three groups being, respectively, 35%, 55% and 66% of the additive powers of the respective near vision fields. Although all lenses of a series have the same curvature on their front surfaces, the curvature on the front surface will vary for each series. Each series will, however, be divided into a plurality of groups with different ranges of near vision powers for each group and with each group having a different ratio between the intermediate and near vision powers and with the smaller ratios for the group having the lower ranges of near vision powers.

Instead of using a single ratio between the near and intermediate powers for all lens blanks in the series, we have provided a series having three separate groups of lens blanks, with each group employing a different ratio between the near and intermediate powers. This takes into account the differing amounts of amplitude of binocular accommodation which are available to presbyopes requiring near vision powers from about 1.50 D to 4.50 D and provides an integrated series of lenses which will give a range of continuous, comfortable, vision from infinity to the near point.

Various modifications can be made without departing from the spirit of our invention as pointed out in the appended claims.

We claim:

1. An integrated series of trifocal opthalmic lens blanks, each blank having the same curvature on its front convex face, each blank having near, intermediate and distant vision fields, all lens blanks of the series having near vision dioptric powers ranging from 1.50 D to 4.50 D, both inclusive, said series comprising a plurality of groups of lens blanks with the lens blanks of each group having a different range of near vision powers, all lens blanks of each group having substantially the same ratio between the intermediate and near vision powers, the ratio for each group being different, the ratio for a group having the lower ranges of near vision powers being smaller than the ratio for a group having the higher range of near vision powers whereby a lens produced from any of said blanks will provide continuous, comfortable, vision for objects located at distances varying from near point to infinity.

2. A series of trifocal ophthalmic lens blanks each having near, intermediate and distant vision fields, the lens blanks of the series having additive powers in the near vision fields ranging from 1.50 D to 4.50 D, both inclusive, each lens blank of the series having the same curvature on its front surface, said series consisting of three groups of lenses having additive powers in the near vision fields whose ranges are, respectively, 1.50–1.75 D, 2.00–2.75 D and 3.00–4.50 D, the approximate ratios between the additive powers in the intermediate and near vision fields for lens blanks in each of said groups being, respectively, 35%, 55% and 66% whereby a lens produced from any of said blanks will provide a range of continuous, comfortable, vision from infinity to the near point.

References Cited in the file of this patent

UNITED STATES PATENTS 2,173,651    Hill _____ Sept. 19, 1939

OTHER REFERENCES

"Rx Lenses," American Optical Co., Catalog published in 1950, pages 40–45.